(12) United States Patent
Kaminaka et al.

(10) Patent No.: US 9,947,941 B2
(45) Date of Patent: Apr. 17, 2018

(54) TITANIUM MATERIAL FOR POLYMER ELECTROLYTE FUEL CELL SEPARATOR, METHOD FOR PRODUCING THE SAME, AND POLYMER ELECTROLYTE FUEL CELL USING THE SAME

(75) Inventors: Hideya Kaminaka, Tokyo (JP); Kentarou Yoshida, Tokyo (JP); Kouichi Takeuchi, Tokyo (JP); Satoshi Matsumoto, Tokyo (JP)

(73) Assignee: NIPPON STEEL & SUMITOMO METAL CORPORATION, Tokyo (JP)

(*) Notice: Subject to any disclaimer, the term of this patent is extended or adjusted under 35 U.S.C. 154(b) by 330 days.

(21) Appl. No.: 14/349,797

(22) PCT Filed: Jul. 19, 2012

(86) PCT No.: PCT/JP2012/004589
§ 371 (c)(1),
(2), (4) Date: Apr. 4, 2014

(87) PCT Pub. No.: WO2013/073076
PCT Pub. Date: May 23, 2013

(65) Prior Publication Data
US 2014/0255816 A1   Sep. 11, 2014

(30) Foreign Application Priority Data
Nov. 18, 2011 (JP) .................. 2011-252582

(51) Int. Cl.
*H01M 8/02* (2016.01)
*H01M 8/0208* (2016.01)
(Continued)

(52) U.S. Cl.
CPC ........... *H01M 8/0208* (2013.01); *C22C 14/00* (2013.01); *C22F 1/00* (2013.01); *C22F 1/18* (2013.01);
(Continued)

(58) Field of Classification Search
CPC ............ H01M 8/0208; H01M 8/0215; H01M 8/0228; H01M 2008/1095; C22F 1/183;
(Continued)

(56) References Cited

U.S. PATENT DOCUMENTS 5,091,148 A * 2/1992 Prasad .................. A61K 6/043
420/417
2006/0003174 A1* 1/2006 Yashiki ............... H01M 8/0208
428/472
(Continued)

FOREIGN PATENT DOCUMENTS

CN  1715431      1/2006
JP  11-162479    6/1999
(Continued)

OTHER PUBLICATIONS

Saitoh et al., "Reduction in . . . after Picking", R&D Kobe Steel Engineering Reports, vol. 55, No. 3, Dec. 2005.

*Primary Examiner* — Ula C Ruddock
*Assistant Examiner* — Matthew W Van Oudenaren
(74) *Attorney, Agent, or Firm* — Clark & Brody (57) ABSTRACT

A titanium material for a polymer electrolyte fuel cell separator consists of, by mass %, a platinum group metal: 0.005% to 0.15% and a rare earth metal: 0.002% to 0.10%, with the balance being Ti and impurities. The titanium material of the present invention is provided with a film formed of a titanium oxide and a platinum group metal on the surface thereof. It is preferred that the film has a thickness of 50 nm or less, and that the concentration of the platinum group metal on the surface of the film is 1.5% by mass or more. With the thus formed film, the titanium material of the present invention is capable of achieving a reduction in initial contact resistance and ensuring good corrosion resistance. In the titanium material of the present (Continued)

invention, the rare earth metal is preferably Y, and the platinum group metal is preferably Pd.

7 Claims, 2 Drawing Sheets

(51) Int. Cl.
*C22C 14/00* (2006.01)
*C22F 1/00* (2006.01)
*C22F 1/18* (2006.01)
*H01M 8/0228* (2016.01)
*H01M 8/0215* (2016.01)
*C23G 1/10* (2006.01)
*H01M 8/1018* (2016.01)
*B22F 1/00* (2006.01)

(52) U.S. Cl.
CPC .............. *C22F 1/183* (2013.01); *C23G 1/106* (2013.01); *H01M 8/0215* (2013.01); *H01M 8/0228* (2013.01); *B22F 1/0003* (2013.01); *H01M 2008/1095* (2013.01); *Y02P 70/56* (2015.11)

(58) Field of Classification Search
CPC ... C22F 1/18; C22F 1/00; C23G 1/106; C22C 14/00; B22F 1/003
See application file for complete search history.

(56) References Cited

U.S. PATENT DOCUMENTS

2009/0211667 A1* 8/2009 Suzuki ................ H01M 8/0206
  148/281
2011/0250522 A1 10/2011 Kaminaka et al.

FOREIGN PATENT DOCUMENTS

| JP | 2003-105523 | 4/2003 |
| JP | 2006-190643 | 7/2006 |
| JP | 4032068 | 1/2008 |
| JP | 4367062 | 11/2009 |
| JP | 2010-129458 | 6/2010 |

\* cited by examiner

TITANIUM MATERIAL FOR POLYMER ELECTROLYTE FUEL CELL SEPARATOR, METHOD FOR PRODUCING THE SAME, AND POLYMER ELECTROLYTE FUEL CELL USING THE SAME

TECHNICAL FIELD

The present invention relates to a polymer electrolyte fuel cell (solid polymer electrolyte fuel cell), a titanium material for use in a separator, which is a component thereof, and a method for producing the titanium material.

BACKGROUND ART

For power generation, fuel cells utilize the energy released during the reaction in which hydrogen and oxygen combine. Thus, in view of energy conservation and environmental protection measures, it is a next generation power generating system the practical and widespread use of which is desired. There are a variety of types of fuel cells, including solid electrolyte fuel cells, molten carbonate fuel cells, phosphoric acid fuel cells, and polymer electrolyte fuel cells.

Among these, polymer electrolyte fuel cells have a higher power density and can be made more compact. Also, they operate at low temperatures and provide ease in starting and stopping as compared to other types of fuel cells. Because of this, polymer electrolyte fuel cells in particular have been given much attention in recent years as they are expected to be used in electric vehicles and home use small cogeneration equipment.

Figure 1:
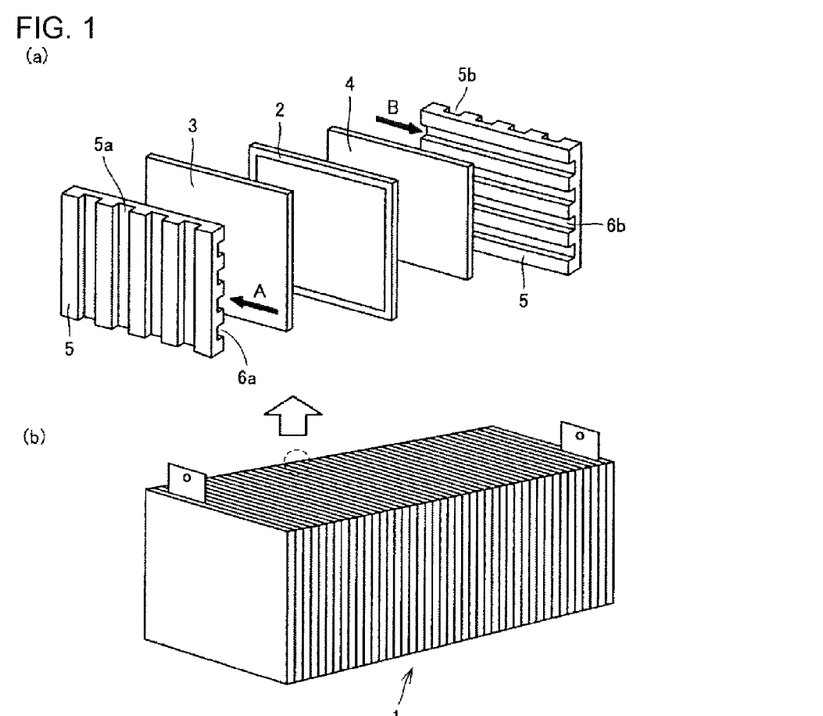
FIG. 1 is a diagram illustrating a configuration of a polymer electrolyte fuel cell, with FIG. 1(a) being an exploded view of a unit cell that constitutes the fuel cell and FIG. (b) being an overall perspective view of the fuel cell composed of an assembly of multiple unit cells.

FIG. 1 is a diagram illustrating a configuration of a polymer electrolyte fuel cell (hereinafter also referred to simply as a "fuel cell") with FIG. 1(a) being an exploded view of a unit cell that constitutes the fuel cell and FIG. (b) being an overall perspective view of the fuel cell composed of an assembly of multiple unit cells.

As shown in FIG. 1, the fuel cell 1 is a stack of unit cells. In a unit cell, as shown in FIG. 1(a), what is called an anode-side gas diffusion layer 3 or a fuel electrode 3 (hereinafter referred to simply as an "anode") is disposed on one side of a polymer electrolyte membrane 2. On the other side of the polymer electrolyte membrane 2 is disposed what is called a cathode-side gas diffusion layer 4 or an oxidizing electrode 4 (hereinafter referred to simply as a "cathode"). The unit cell has a structure in which: the anode 3 is disposed on one side of the polymer electrolyte membrane 2 and the cathode 4 is disposed on the other side thereof; and separators (bipolar plates) 5a, 5b are disposed on the one and the other sides, respectively.

Examples of fuel cells include a water-cooled fuel cell in which a water separator having a cooling water channel is interposed between unit cells or between sets of two or more unit cells. Such a water-cooled fuel cell is also within the scope of the present invention.

As the polymer electrolyte membrane 2 (hereinafter simply referred to as "electrolyte membrane"), a fluorinated proton conducting membrane having hydrogen ion (proton) exchange groups is used. The anode 3 and cathode 4 may be provided with a catalyst layer that includes a particulate platinum catalyst, graphite powder, and optionally a fluorocarbon resin with hydrogen ion (proton) exchange groups. In this case, the reaction is promoted by contact of a fuel gas or an oxidizing gas with the catalyst layer.

A fuel gas A (hydrogen or a hydrogen containing gas) is fed through a channel 6a formed in the separator 5a to supply hydrogen to the fuel electrode 3. An oxidizing gas B such as air is fed through a channel 6b formed in the separator 5b to supply oxygen. The supply of these gases causes an electrochemical reaction to generate direct current power.

The following are major functions required of a separator of a polymer electrolyte fuel cell.

(1) a function as a "channel" for uniformly supplying a fuel gas and an oxidizing gas to the electrode surfaces;

(2) a function as a "channel" for efficiently removing water produced at the cathode side from the fuel cell system together with carrier gases such as air and oxygen after the reaction.

(3) a function of providing a path for electricity by contacting with the electrodes (anode 3 and cathode 4) and serving as an electrical "connector" between unit cells;

(4) a function as an "isolating wall" between adjacent unit cells for isolating an anode chamber of one unit cell from a cathode chamber of an adjacent unit cell; and (5) in a water-cooled fuel cell, a function as an "isolating wall" for isolating a cooling water channel from an adjacent unit cell.

Separators for use in a polymer electrolyte fuel cell (hereinafter simply referred to as "separators") are required to provide the above-described functions. As a base material to produce such separators, either a metal-based material or a carbon-based material is generally used.

Metal materials such as titanium have advantages of, e.g., exhibiting good workability typical of metals and thus allowing production of thinner separators, which results in production of lighter-weight separators. However, they are disadvantageous in that oxidation on the metal surface may cause a decrease in electrical conductivity. Thus, separators made from metal materials (hereinafter simply referred to as "metallic separators") pose a problem of a possible increase in contact resistance by contact with the gas diffusion layer.

On the other hand, carbon materials have the advantage of providing light-weight separators, whereas they have disadvantages of, e.g., having gas permeability and exhibiting low mechanical strength.

With regard to metallic separators, particularly separators made of a titanium material (hereinafter simply referred to as a "titanium separator"), there are various conventional proposals as disclosed in Patent Literatures 1 to 5 listed below.

Patent Literature 1 proposes a titanium separator having a noble metal thin film, mainly of gold, formed on its surface, e.g., by plating after removal of a passivation film from the surface of the separator that is to be in contact with an electrode in order to improve corrosion resistance (resistance to oxidation). However, using large amounts of noble metal, particularly gold, in fuel cells for mobile systems such as automobiles or in stationary fuel cells is disadvantageous in view of economies and limited resources. Therefore the titanium separator proposed in Patent Literature 1 has not seen widespread use.

Patent Literature 2 proposes a solution to the problem of corrosion resistance (resistance to oxidation) of a titanium separator without the use of noble metals, particularly gold. Patent Literature 2 proposes a titanium separator having on its surface a conductive interface layer containing carbon formed by vapor deposition. However, vapor deposition is a process that requires special equipment, which leads to increased equipment costs and many hours of operation. This results in a decrease in productivity and thus causes a problem. Because of this, the titanium separator proposed in Patent Literature 2 is currently not being utilized actively.

Patent Literature 3 proposes a method for reducing the increase in contact resistance that may occur due to oxidation on the metal surface, the method including using a titanium separator having on its surface a metallic film containing dispersed electrically conductive ceramics. This material having a ceramic-containing metallic film is disadvantageous in that: in stamping a sheet blank into a separator shape, the dispersed ceramics hinder the forming process, and sometimes cracking may occur or a through-hole may be formed in the separator during the processing. In addition, since ceramic materials may cause wear of a press mold, it may become necessary to replace the press mold with one made of an expensive material such as cemented carbide. For these reasons, the titanium separator proposed in Patent Literature 3 has not been put into practical use.

Patent Literature 4 proposes a titanium material for use in separators, the titanium material being formed by: subjecting a titanium alloy base material containing a platinum group metal to a pickling process by immersing it in a solution containing a non-oxidizing acid and an oxidizing acid, thereby causing concentration of the platinum group metal on the surface, and thereafter heat treating the titanium alloy base material in a low oxygen atmosphere. This results in formation of a mixture layer of the platinum group metal and a titanium oxide on the surface of the titanium material for separators, thereby providing the titanium material with good electrical conductivity, with the contact resistance being 10 m$\Omega \cdot cm^2$ or less when an electric current of 7.4 mA is applied at a surface pressure of 5 kg/$cm^2$.

In Patent Literature 4, reduction of contact resistance is accomplished by performing a heat treatment. This leads to thickening of the passivation film on the surface of the titanium plate, which results in problems of an increase in contact resistance and instability of contact resistance in the use for a long period of time. Furthermore, performing a heat treatment leads to increased costs, and what is more, it poses problems of reduced productivity and deformation by heat treatment due to the severe atmosphere conditions in the heat treatment. In addition, Non-Patent Literature 1 also discloses a titanium material of the type proposed in Patent Literature 4.

Patent Literature 5 proposes a titanium material for use in separators having a platinum group metal-concentrated layer on the surface thereof, the titanium material being formed by subjecting a titanium alloy base material containing a platinum group metal to a pickling process by immersing it in an acid solution containing a non-oxidizing acid.

Furthermore, in Patent Literatures 4 and 5, from a standpoint of inhibiting absorption of hydrogen into the titanium material, an acid solution containing an oxidizing acid is used in the pickling process. Because of this, in the titanium materials proposed in Patent Literatures 4 and 5, titanium oxides are formed in a layer under a redeposited platinum group metal layer, which poses a problem of a high initial contact resistance in the as-pickled state. Also, there are further problems in that, e.g., the thickening of the surface passivation film leads to an increase in contact resistance due to the influence of corrosion products or the like when the fuel cell is operated for a long time. In particular, in the invention disclosed in Patent Literature 4, the above-described problems become even more serious due to the heat treatment performed.

CITATION LIST

Patent Literature

Patent Literature 1: Japanese Patent Application Publication No. 2003-105523

Patent Literature 2: Japanese Patent No. 4367062
Patent Literature 3: Japanese Patent Application Publication No. H11-162479
Patent Literature 4: Japanese Patent No. 4032068
Patent Literature 5: Japanese Patent Application Publication No. 2006-190643

Non-Patent Literature

Non-Patent Literature 1: Research and Development, KOBE STEEL ENGINEERING REPORTS, vol. 55, No. 3 (2005), Toshiki SATOH, Shinji SAKASHITA, Takashi YASHIKI, Masahito FUKUDA, pp. 48 to 51.

SUMMARY OF INVENTION

Technical Problem

As described above, for titanium separators, certain techniques have been proposed in order to solve the problem of a decrease in electrical conductivity and an increase in contact resistance due to oxidation on the surface. The techniques include noble metal plating, particularly with gold; carbon vapor deposition; dispersion of ceramics; and concentration of a platinum group metal. However, the techniques of noble metal plating, carbon vapor deposition, and dispersion of ceramics have not seen widespread use.

In view of the above, the present inventors turned their attention to the technique of concentration of a platinum group metal and made studies, and found that there were problems to be solved as described in the items (1) to (3) below.

(1) Increasing the Rate of Platinum Group Metal Concentration/Saving of Time for Surface Treatment As described above, according to the examples of Patent Literatures 4 and 5, concentration of a platinum group metal is accomplished by immersion into an acid solution containing an oxidizing acid, and this causes an increase in the thickness of the surface film. Because of this, due to the need for an increased amount of platinum group metal to be concentrated on the surface, the treatment for concentration must be performed for a longer time, requiring five minutes or more of immersion time. In order to ensure sufficient productivity, this surface treatment must be completed within a short period of time so that continuous treatment is made possible.

(2) Reduction of Platinum Group Metal Content

It is necessary to develop a material that allows concentration of a platinum group metal on the surface at a high concentration and in an easy manner and thus achieves a reduction in initial contact resistance, as compared to conventional materials, even when using a material having a low content of platinum group metal, which is an expensive material.

(3) Elimination of Vacuum Heat Treatment

In the case of the titanium separator as proposed in Patent Literature 4, the passivation film that is formed on the titanium surface by the pickling process has extremely low electrical conductivity in the as-pickled state. Because of this, in order to form an electrical conductive path between the titanium matrix and the film surface by mixing the redeposited platinum group metal with the passivation film, a heat treatment in a vacuum atmosphere (low oxygen atmosphere) is performed to allow the mixing by thermal diffusion. This heat treatment causes an increase in the thickness of the passivation film, which results in problems of an increased contact resistance, a decrease in long-term stability, and even a deformation of the separator after stamping.

The present invention has been made in view of this situation. Accordingly, an object of the present invention is to provide a titanium material for polymer electrolyte fuel cell (solid polymer electrolyte fuel cell) separators, a method for producing the same, and a polymer electrolyte fuel cell using the same, which are capable of solving the above-noted problems (1) to (3).

Solution to Problem

In order to solve the above-noted problems (1) to (3), the present inventors searched for a method that is capable of achieving good electrical conductivity by providing a titanium separator with a surface to which a platinum group metal is exposed and concentrated at a high concentration and in an easy manner.

After extensive studies, they have found that, as with the titanium separators proposed in Patent Literatures 4 and 5, subjecting a platinum group metal-containing titanium alloy to a pickling process is an effective technique. In view of this, they searched for a method of pickling for achieving concentration of a platinum group metal on the surface of a titanium alloy in a shorter time and at a higher concentration. Specifically, trace quantities of various elements were added to a platinum group metal-containing titanium alloy to be pickled, and the resulting concentrations of the platinum group metal on the surface were compared. As a result, it has been found that, by addition of a rare earth metal to a platinum group metal-containing titanium alloy within the limit of solid solubility, it is possible to allow the platinum group metal to be concentrated on the surface in a shorter time and at a higher concentration than in conventional techniques.

This is considered to be attributable to the increase in the dissolution rate of titanium in an acidic environment that occurs when trace quantities of rare earth metal are added to a titanium alloy. For example, experiments showed that, when 0.01 mass % yttrium (Y) is added to pure titanium of JIS (Japan Industrial Standards) class 1, its dissolution rate when immersed in a boiling 3% hydrochloric acid solution increases by four times.

Another finding from the experiments was that, when trace quantities of rare earth metal are added to a platinum group metal-containing titanium alloy within the limit of solid solubility, the rate of dissolution and redeposition of the platinum group metal increases with the increase of the dissolution rate of the titanium, and accordingly the rate of platinum group metal concentration on the surface of the titanium alloy increases. Furthermore, still another finding from the experiments was that, under the condition using the same immersion time in the pickling process, a titanium alloy with a rare earth metal added exhibits a higher level of platinum group metal concentration on the surface than a titanium alloy with no rare earth metal added. An example of these experimental results are shown in FIG. 2.

Figure 2:
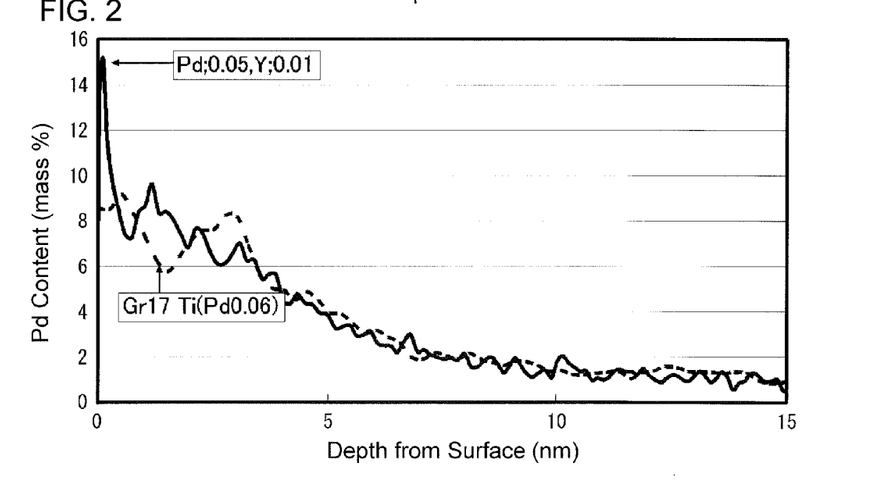
FIG. 2 is a graph illustrating a comparison of Pd concentration profiles near the surface of a titanium alloy between the case in which a rare earth metal was added and the case in which a rare earth metal was not added.

FIG. 2 is a graph illustrating a comparison of Pd concentration profiles near the surface of a titanium alloy between the case in which a rare earth metal was added and the case in which a rare earth metal was not added. For the experiment that provided the results shown in FIG. 2, the following materials were prepared: a titanium material formed of a titanium alloy (ASTM grade 17); and a rare earth metal-added titanium material formed of a titanium alloy (ASTM grade 17) with Y, which is a rare earth metal element, added in an amount of 0.01% by mass. These titanium materials were subjected to a pickling process by immersion into a boiling 3% hydrochloric acid solution for 96 hours. The titanium materials after undergoing the pickling process were each analyzed for a profile of Pd concentration versus depth (thickness) using the GDOES method. Table 1 shows the details of the analysis by the GDOES method on the profiles of Pd concentration versus depth.

TABLE 1

| Object | Analysis Method | Analyzer | Determination of Pd content |
|---|---|---|---|
| Pd Concentration Versus Depth Profile | GDOES | Marcus Type RF Glow Discharge Optical Emission Spectrometer (HORIBA GD-Profiler 2) | Calibration curves generated for calculation of Pd content using pure Pd, Ti—0.15 Pd, Ti—0.06 Pd and pure Ti |

FIG. 2 shows that the case in which 0.01 mass % Y was added (see the curved solid line) exhibited a Pd concentration on the surface (0 nm in depth) 1.6 times higher than the case in which Y was not added (see the curved dashed line).

In the case in which 0.01 mass % Y was added, the Pd concentration on the surface after the surface treatment by pickling was about 15% by mass and the Pd content in the matrix was 0.05% by mass. That is, under this immersion condition, the Pd was concentrated on the surface to a level about 300 times higher than in the matrix.

Although FIG. 2 shows only one case using a rare earth metal, i.e., the case using Y, it was observed that other rare earth metals are also capable of allowing the concentration of a platinum group metal at a high concentration.

The above effect produced by the addition of a rare earth metal to a titanium alloy is a new finding obtained during the course of the study of the present invention.

Based on these experimental facts, the present inventors made extensive studies on the concentration of a platinum group metal on the surface of a titanium alloy and a reduction in contact resistance (initial contact resistance) of a titanium alloy having a surface with the platinum group metal concentration. Consequently, they have made the following findings (a) to (f).

(a) A titanium alloy consists of, by mass %, a platinum group metal: 0.005% to 0.15% and a rare earth metal: 0.002% to 0.10%, with the balance being Ti and impurities. By subjecting the titanium alloy to a pickling process, the platinum group metal is dissolved and redeposited on the alloy surface. This allows the platinum group metal, which has good electrical conductivity, to be exposed to the surface of the titanium alloy while being concentrated, and therefore enables the production of a titanium material having a reduced contact resistance and thus being suitable for use in separators for a polymer electrolyte fuel cell. It is presumed that this phenomenon occurs by the following process: since the redeposition rate of the platinum group metal is increased due to the effect of the addition of a rare earth metal, the redeposition takes place in a state in which the platinum group metal is mixed with the passivation film formed during the pickling process, and part of the platinum group metal is exposed and deposited onto the passivation film.

(b) In order to produce a titanium material having a reduced contact resistance and thus being suitable for use in separators, a film formed of a titanium oxide and a platinum group metal provided on the surface of the titanium alloy by the above-mentioned pickling process preferably has a thickness of 50 nm or less.

(c) In order to produce a titanium material having a reduced contact resistance and thus being suitable for use in separators, the concentration of the platinum group metal exposed to the surface of the titanium alloy is preferably 1.5% by mass or more. Furthermore, the platinum group metal-concentrated layer formed by the exposure of the platinum group metal to the surface of the titanium alloy preferably has a thickness of 1 nm or more.

(d) When Y is used as the rare earth metal to be included in the titanium alloy, the surface treatment for the platinum group metal concentration on the surface of the titanium alloy is easily achieved.

(e) When Pd is used as the platinum group metal to be included in the titanium alloy, the reduction in contact resistance is further enhanced, thus allowing the production of a titanium material more suitable for use in separators for a polymer electrolyte fuel cell.

(f) In order to initiate the dissolution reaction as described in the above item (a), the titanium alloy as described in the above item (a) is immersed in a non-oxidizing acid solution mainly containing hydrochloric acid, which is capable of readily dissolving rare earth metals, to allow the platinum group metal to be concentrated on the surface of the alloy. This enables the production of a titanium material having a reduced contact resistance, and the resulting titanium material is suitable for use in separators.

The present invention has been accomplished based on the above findings, and the summaries thereof relate to: a titanium material for a polymer electrolyte fuel cell separator as described in the items (1) to (5) below; a method for producing a titanium material for a polymer electrolyte fuel cell separator as described in the items (6) and (7) below; and a polymer electrolyte fuel cell as described in the item (8) below.

(1) A titanium material for a polymer electrolyte fuel cell separator consisting of, by mass %, a platinum group metal: 0.005% to 0.15% and a rare earth metal: 0.002% to 0.10%, with the balance being Ti and impurities.

(2) The titanium material for a polymer electrolyte fuel cell separator according to the above item (1), wherein the titanium material is provided with a film formed of a titanium oxide and the platinum group metal on a surface thereof, and the film has a thickness of 50 nm or less.

(3) The titanium material for a polymer electrolyte fuel cell separator according to the above item (2), wherein the concentration of the platinum group metal on a surface of the film is 1.5% by mass or more.

(4) The titanium material for a polymer electrolyte fuel cell separator according to any one of the above items (1) to (3), wherein the rare earth metal is Y.

(5) The titanium material for a polymer electrolyte fuel cell separator according to any one of the above items (1) to (4), wherein the platinum group metal is Pd.

(6) A method for producing a titanium material for a polymer electrolyte fuel cell separator, the method comprising: subjecting a titanium alloy to a pickling process using a non-oxidizing acid solution, the titanium alloy consisting of, by mass %, a platinum group metal: 0.005% to 0.15% and a rare earth metal: 0.002% to 0.10%, with the balance being Ti and impurities; and allowing the platinum group metal to be concentrated on a surface of the titanium alloy.

(7) The method for producing a titanium material for a polymer electrolyte fuel cell separator according to the above item (6), wherein the non-oxidizing acid solution contains hydrochloric acid as an essential component.

(8) A polymer electrolyte fuel cell comprising a stack of unit cells, the unit cells being arranged adjacent each other with a separator disposed therebetween, each of the unit cells including a fuel electrode, an oxidizing electrode, and a polymer electrolyte membrane interposed between the fuel electrode and the oxidizing electrode, the stack of unit cells being supplied with a fuel gas and an oxidant gas to generate direct current power, wherein the separator comprises the titanium material according to any one of the above items (1) to (5).

In the description below, the unit "%", used in relation to the titanium alloy composition, is meant to indicate "% by mass".

Advantageous Effects of Invention

The titanium material of the present invention is capable of being provided, with high efficiency, with a film having good electrical conductivity on the surface thereof because of a rare earth metal included therein. With this film, the titanium material of the present invention is capable of achieving a reduction in initial contact resistance and ensuring good corrosion resistance.

The method for producing a titanium material of the present invention is capable of forming a film having good electrical conductivity without the need for a heat treatment after the pickling process and therefore is able to improve productivity.

The polymer electrolyte fuel cell of the present invention includes a separator made of the titanium material of the present invention in which a reduced contact resistance is achieved and good corrosion resistance is ensured as described above. Because of this, the polymer electrolyte fuel cell has a high initial voltage and exhibits a reduced voltage decay over time.

DESCRIPTION OF EMBODIMENTS

As described above, the titanium material of the present invention consists of, a platinum group metal: 0.005% to 0.15% and a rare earth metal: 0.002% to 0.10%, with the balance being Ti and impurities. The details of the present invention are set out below.

1. Composition Range of Titanium Material and Reasons for the Limitations 1-1. Platinum Group Metal The platinum group metal as used herein refers to Ru, Rh, Pd, Os, Ir, and Pt. Platinum group metals have an electrical resistivity lower than that of Ti. They are resistant to oxidation and corrosion in polymer electrolyte fuel cell operating environments and does not cause an increase in electrical resistivity. On the other hand, Ti inherently has a high electrical resistivity as compared to platinum group metals. Moreover, its electrical resistivity is further increased when a strong passivation film is formed on the surface of the titanium material in the atmosphere or in polymer electrolyte fuel cell operating environments. The passivation film that is formed on the surface of the titanium material serves as a protection mechanism for allowing the Ti to exhibit excellent corrosion resistance in a variety of environments, and therefore is necessary when a titanium alloy is used in a separator in order to maintain the corrosion resistance.

The titanium material of the present invention is capable of being provided with a film formed of a titanium oxide and a platinum group metal on the surface thereof by being subjected to a surface treatment by pickling as described later, and this film is the passivation film. Specifically, the surface of the titanium material is covered by the passivation film composed of a titanium oxide while the platinum group metal is concentrated therein. This concentrated platinum group metal penetrates the passivation film to establish an electrical path between the passivation film and the titanium material matrix. Because of this, the titanium material of the present invention has a reduced contact resistance, which is achieved by the platinum group metal, while at the same time exhibiting corrosion resistance, which is achieved by the titanium oxide.

The titanium material of the present invention is formed by including therein one or more of the platinum group metals as mentioned above. The total content of the platinum group metals included (hereinafter simply referred to as "platinum group metal content") should be in the range of 0.005% to 0.15%. This has been determined based on a platinum group metal content necessary to allow the concentration of the platinum group metal on the surface of the titanium material by a surface treatment by later-described pickling and achieve a reduced contact resistance. When the platinum group metal content is less than 0.005%, a sufficient concentration of the platinum group metal does not occur on the surface of the titanium material, so that a reduction in contact resistance cannot be achieved. Meanwhile, a platinum group metal content exceeding 0.15% results in an enormous material cost.

In light of the balance between the economic advantage and corrosion resistance, the platinum group metal content is preferably in the range of 0.01% to 0.05%. This is because, even with this range of platinum group metal content, the titanium material of the present invention has a contact resistance comparable to that of a titanium material having a platinum group metal content exceeding 0.05%, and therefore is able to achieve a reduced contact resistance.

In the present invention, among platinum group metals, Ru, Rh, Pd, Os, Ir, and Pt, Pd is most preferred because it is relatively inexpensive and achieves a high degree of reduction in contact resistance relative to its content. On the other hand, Rh and Pt are economically disadvantageous because they are very expensive. Furthermore, Ru and Ir are somewhat less expensive than Pd, and may be used as substitutes for Pd. However, their outputs are not as high as that of Pd, and therefore Pd, which is stably available, is preferred.

1-2. Rare Earth Metal
1-2-1. Reasons for Inclusion of Rare Earth Metal

The present inventors have examined the effect of reducing contact resistance achieved by the concentration of a platinum group metal. In the examination, not only rare earth metals but also a variety of elements were added to a Ti-0.02Pd alloy, and the titanium alloy was subjected to a surface treatment by immersion into a 7.5% hydrochloric acid solution at 60° C. As a result of research into the variety of elements, rare earth metals were found to be effective in reducing the contact resistance through concentration of a platinum group metal.

Rare earth metals consist of Sc, Y, light rare earth elements (La to Eu), and heavy rare earth elements (Gd to Lu). Based on the results of studies by the present inventors, it was found that all the rare earth metals as mentioned above are effective in reducing the contact resistance of a titanium material through concentration of a platinum group metal. Furthermore, the above effect was observed not only in a case in which only a single element of the rare earth metals is used but also in a case in which a mixture of rare earth metals is used, e.g., a mixed rare earth metal before separation and refining (misch metal, hereinafter simply referred to as "Mm") or a didymium (a mixture of Nd and Pr).

It is therefore preferred from the economic standpoint that, among all the rare earth metals, La, Ce, Nd, Pr, Sm, Mm, didymium, Y, and the like be used because of their availability and relative inexpensiveness. Y is readily soluble in a non-oxidizing acid, particularly hydrochloric acid, and readily enables the surface treatment that allows the concentration of a platinum group metal on the surface of a titanium alloy. Because of this, the most preferred rare earth metal is Y. As for the compositions of Mm and didymium, any rare earth metals may be employed as the constituents in any proportion as long as they are commercially available.

1-2-2. Content of Rare Earth Metal

The titanium material of the present invention is formed by including therein one or more of the rare earth metals as mentioned above. The total content of the rare earth metals included (hereinafter simply referred to as "rare earth metal content") should be in the range of 0.002% to 0.10%. The reason for specifying the lower limit of 0.002% on the rare earth metal content is that it is necessary for the purpose of adequately ensuring the advantage of promoting deposition of the platinum group metal onto the surface of the alloy by allowing the Ti and the rare earth metal to be dissolved simultaneously in an aqueous solution containing a non-oxidizing acid in the activation potential of the platinum group metal-containing titanium material.

The reason for specifying the upper limit of 0.10% on the rare earth metal content is that an excessively high amount of rare earth metal in a platinum group metal-containing titanium material can produce a new compound within the titanium material. This new compound preferentially partially dissolves in a non-oxidizing acid aqueous solution, which leads to initiation of pitting corrosion in the platinum group metal-containing titanium material. This hinders a uniform concentration of the platinum group metal on the surface of the titanium material having the compound, and therefore a uniform reduction in contact resistance on the surface is not achieved. Also, during the use as a separator, the titanium material may suffer corrosion attack due to the rare earth metal compound, which results in an increase in contact resistance. Because of this, the rare earth metal content of the titanium material of the present invention is preferably not more than the limit of solid solubility in $\alpha$-Ti as shown in a phase diagram or the like so that no compound is formed.

1-3. Optional Elements

The titanium material of the present invention may include Ni, Mo, V, Cr, and W as a partial replacement for Ti. Including these elements results in high crevice corrosion resistance due to the synergy with the rare earth metal. When these elements are included, their contents are as follows: Ni: 1.0% or less, Mo; 0.5% or less, V: 0.5% or less, Cr: 0.5% or less, and W: 0.5% or less.

1-4 Impurity Elements

Impurity elements in a titanium material include, by way of example, Fe, O, C, H, N, and the like entering from raw materials, a dissolving electrode and the environment as well as Al, Cr, Zr, Nb, Si, Sn, Mn, Cu, and the like introduced when scraps or the like are used as raw materials. Introduction of these impurity elements is of no matter as long as it does not adversely affect the advantages of the present invention. Specifically, the compositional range not adversely affecting the advantages of the present invention is as follows, Fe: 0.3% or less, O: 0.35% or less, C: 0.18% or less, H: 0.015% or less, N: 0.03% or less, Al: 0.3% or less, Cr: 0.2% or less, Zr: 0.2% or less, Nb: 0.2% or less, Si: 0.02% or less, Sn: 0.2% or less, Mn: 0.01% or less, and Cu: 0.1% or less, with the total of these being 0.6% or less.

2. Passivation Film

As previously noted, the titanium material of the present invention is capable of being provided with a film formed of a titanium oxide and a platinum group metal on the surface thereof by being subjected to a surface treatment by pickling as described later, and the formed film is a passivation film. The passivation film is composed of a mixture of the titanium oxide and the platinum group metal redeposited through the pickling process, and has good electrical conductivity. The platinum group metal in the film is believed to be present as a metal and therefore form an electrical path between the titanium material (matrix) and the film surface.

The surface treatment by pickling for forming such a passivation film is described later in detail. Briefly, in a titanium material that contains a platinum group metal and a rare earth metal, the Ti, rare earth metal and platinum group metal therein are leached into the solution in the process of dissolution of the titanium material, which is effected by the pickling process, and the platinum group metal is redeposited onto the surface. In the meantime, oxidation of the Ti and others takes place simultaneously on the surface of the titanium material, forming an oxide of titanium, a rare earth metal and the like on the surface. The redeposited platinum group metal and the formed oxides of Ti and others are further leached by the pickling process. By repeating the above process, the titanium material is provided, on its surface, with a film in which the Ti-based oxide and the platinum group metal are mixed. At a stage where a certain level of platinum group metal concentration has been achieved, the dissolution (oxidation) reaction is discontinued due to the inhibitory effect of the platinum group metal (e.g. Pd).

In the titanium material of the present invention, the dissolution takes place rapidly at an early stage of the dissolution reaction because of the rare earth metal included therein. Because of this, it is possible to increase the platinum group metal concentration near the surface of the titanium material and, even if the platinum group metal content in the titanium material is reduced, it is possible to efficiently promote the concentration near the surface. Furthermore, when a titanium material is used in a separator for a polymer electrolyte fuel cell, the passivation film having good electrical conductivity may sometimes be destroyed in association with use in fuel cells, due to reasons such as friction caused by carbon cloth or the like that is in contact with the surface of the separator. Even when this occurs, if the titanium material of the present invention is used, corrosion occurs rapidly to cause the dissolution reaction to progress to thereby allow the reconcentration of the platinum group metal on the surface of the titanium material. This self repair ability is also a feature of the titanium material of the present invention.

In the titanium material of the present invention, the passivation film having good electrical conductivity, i.e., the film formed of a titanium oxide and a platinum group metal preferably has a thickness of 50 nm or less. A thickness exceeding 50 nm could result in a decrease in surface contact resistance due to the increased proportion of the oxide and corrosion products. More preferably the thickness is 20 nm or less, and even more preferably the thickness is 10 nm or less.

The film thickness may be controlled by adjusting the concentration of the non-oxidizing acid and the treatment temperature. The present material is caused to shift to noble potential when the platinum group metal (e.g. Pd) concentration occurs on the surface. The potential becomes noble in the process of the concentration, and when it exceeds the passivation potential of Ti, the Ti on the surface becomes an oxide so that it is stabilized. That is, the film formation is discontinued.

Regarding the film thickness control, suitable conditions vary depending on the type of non-oxidizing acid used. For example, when hydrochloric acid is used as the non-oxidizing acid, at a concentration of from 7.5% to 12.5%, and the treatment is performed at a temperature of 65° C. for 0.5 minutes, the film thickness can be controlled to be in the range of about 1 to 10 nm.

In the meantime, in the titanium material of the present invention, the film formed of a titanium oxide and a platinum group metal preferably has a thickness of 1 nm or more. This is because an extremely thin thickness could result in a decrease in corrosion resistance.

In the present invention, the thickness of the film formed of a titanium oxide and a platinum group metal is determined in the following manner: the titanium material is cut at the central area in the thickness direction; the cut surface is examined using an electron microscope (e.g., TEM); at arbitrary ten sites of the cut surface, the thickness (the distance from the interface between the matrix and the film formed of a titanium oxide and a platinum group metal to the surface of the titanium material) is measured; and the measured values are averaged.

In the meantime, the thickness of the platinum group metal-concentrated layer is measured in the following manner: after the GDOES measurement as shown in Table 1, the sputter depth is measured using a surface roughness tester, and the sputtering rate is calculated from the time required for the sputtering. The thickness of the platinum group metal-concentrated layer is determined by multiplying the sputtering rate by the sputtering time when the concentration of the platinum group metal becomes half the maximum value in its concentration profile.

Typically, the thickness of the film formed of a titanium oxide and a platinum group metal and the thickness of the platinum group metal-concentrated layer are the same because they are in the form of a film in which a titanium oxide and a platinum group metal are mixed. In the titanium material of the present invention, the platinum group metal is concentrated more heavily at the outermost surface of the film, and thus the amount of concentration of the platinum group metal is small near the interface between the titanium oxide and the titanium matrix as compared to that at the outermost surface. Because of this, analytical errors may occur, or a minor difference may occur between the thickness of the film formed of a titanium oxide and a platinum group metal and the thickness of the platinum group metal-concentrated layer depending on the concentration versus depth profile of the platinum group metal.

In the titanium material of the present invention, the thickness of the platinum group metal-concentrated layer is preferably 1 nm or more. As described above, the thickness of the platinum group metal-concentrated layer is defined as the depth when the platinum group metal concentration becomes half the maximum value in its concentration profile as measured in the depth (thickness) direction of the titanium material. The concentration profile of the platinum group metal can be measured by GDOES analysis. If the titanium material has a thickness of the concentrated layer of 1 nm or more as determined according to the above definition, it is ensured that the titanium material provides a reduced initial contact resistance and exhibits good corrosion resistance. As shown in the later-described examples, with the increase of the platinum group metal content of the titanium material, the thickness of the concentrated layer tends to increase accordingly. However, increasing the platinum group metal content results in reducing the economic advantage, and thus the thickness of the concentrated layer is preferably limited to the upper limit of 10 nm.

In the titanium material of the present invention, the film formed of a titanium oxide and a platinum group metal preferably has a platinum group metal concentration on the surface of 1.5% or more. The platinum group metal concentration on the surface as referred to herein means a concentration thereof at a location of 0 mm depth in the titanium material provided with the film when the concentration versus depth (thickness) profile of the platinum group metal is measured. By controlling the platinum group metal concentration on the surface of the film formed of a titanium oxide and a platinum group metal to be 1.5% or more, it is ensured that the titanium material provides a reduced initial contact resistance and exhibits good corrosion resistance.

3. Method for Producing the Titanium Material

The method for producing a titanium material of the present invention includes: subjecting the titanium alloy having the above-mentioned composition to a pickling process using a non-oxidizing acid solution to allow the platinum group metal to be concentrated on the surface of the titanium alloy. This surface treatment by pickling is performed for the purpose of forming the film formed of a titanium oxide and a platinum group metal, i.e., the passivation film having good electrical conductivity. As described above, the platinum group metal concentration on the surface of the titanium alloy takes place simultaneously with the dissolution reaction caused by oxidation on the surface of the titanium alloy. The use of an oxidizing acid such as nitric acid in the pickling process causes excessive progress of the oxidation reaction, so that no electrical path is formed by the platinum group metal, resulting in an increase in contact resistance. For this reason, a non-oxidizing acid is used in the pickling process.

In pickling of a titanium material, an oxidizing acid is typically used. The purpose of using an oxidizing acid is to oxidize hydrogen produced by pickling in order to prevent absorption of the hydrogen into the titanium alloy. In the meantime, the use of an oxidizing acid leads to thickening of the oxidation layer on the surface of the titanium alloy. Thus, when an oxidizing acid is used in pickling, including the case in which the use is intended for prevention of hydrogen absorption into the titanium alloy, the pickling conditions should be specified which ensure the thickness of the platinum group metal-concentrated layer is controlled to be 10 nm or less.

As a non-oxidizing acid to be used, hydrochloric acid, sulfuric acid or the like may be employed. When hydrofluoric acid, which is also a non-oxidizing acid, is used, adequate control is necessary because it exhibits somewhat lower efficiency in platinum group metal redeposition due to its high power of dissolving a titanium alloy, and it poses a high risk of entry of hydrogen due to the large amount of hydrogen produced per unit time. As can be appreciated, hydrochloric acid, sulfuric acid, hydrofluoric acid, and the like may be used in the form of a mixture thereof.

In the method for producing a titanium material of the present invention, it is preferred that, as the non-oxidizing acid solution, a non-oxidizing acid solution containing hydrochloric acid as an essential component be used. With this, the time required for the pickling process is reduced to one minute or less as shown in the later-described examples. This allows a continuous online operation of pickling, which results in enhanced productivity.

As described, in accordance with the method for producing a titanium material of the present invention, the titanium alloy is capable of being provided with the film formed of a titanium oxide and a platinum group metal on its surface by the pickling process. This film is a passivation film and has good electrical conductivity. Accordingly, the method for producing a titanium material of the present invention does not require a heat treatment after the pickling process as is in conventional methods (e.g., Non-Patent Literature 1), and therefore it is possible to prevent a deformation of a stamped titanium material that may be caused by a heat treatment. It is thus possible to avoid a deformation of a titanium material which has been stamped into a predetermined shape, which may otherwise occur due to the release of distortion by the subsequent heat treatment. As such, the method for producing a titanium material of the present invention is capable of enhancing productivity in producing titanium separators.

4. Polymer Electrolyte Fuel Cell

The polymer electrolyte fuel cell of the present invention includes: a stack of unit cells, the unit cells being arranged adjacent each other with a separator disposed therebetween, each of the unit cells including a fuel electrode, an oxidizing electrode, and a polymer electrolyte membrane interposed between the fuel electrode and the oxidizing electrode, the stack of unit cells being supplied with a fuel gas and an oxidant gas to generate direct current power, wherein the separator includes the titanium material of the present invention as described above. As described above, the titanium material of the present invention is provided with the passivation film having good electrical conductivity, and therefore a reduced initial contact resistance is achieved while good corrosion resistance is ensured. Because of the use of such a titanium material in the separator, the polymer electrolyte fuel cell of the present invention has a high initial voltage and exhibits reduced voltage decay over time.

EXAMPLES

To verify the advantages of the present invention, the following tests were conducted and the results were evaluated.

1. Preparation of Titanium Material

In this test, as test specimen titanium materials, titanium materials of Conventional Example, those of Inventive Example, and those of Comparative Example were prepared. Set forth below are procedures for preparation of titanium materials of Conventional Example, Inventive Example, and Comparative Example.

(1) Titanium Materials of Conventional Example

In order to prepare the titanium materials proposed in Patent Literatures 4 and 5, commercially available titanium alloy sheets with a thickness of 1 mm, made of the following alloys, were obtained: Ti-0.15Pd (JIS Class 7); Ti-0.4Ni-0.015Pd-0.025Ru-0.14Cr (JIS Class 14); and Ti-0.05Pd (JIS Class 17).

[Titanium Material of Patent Literature 5]

Specimens, each having a size of 30 mm by 30 mm, were cut from the above-mentioned three types of sheets, and the surface of the specimen was dry polished using water proof emery paper (SiC). The polishing was carried out using several types of water proof emery paper of different grit numbers, with a finish polishing process performed using 600 grit emery paper. The polished specimens were ultrasonic cleaned in acetone and then subjected to a pickling process to produce the titanium materials (Conventional Examples 4 to 6). Regarding the pickling process, in Conventional Examples 5 and 6, a first pickling process and a second pickling process were performed in sequence with each process using a solution different from the other in the component composition.

Table 2 shows details of the Conventional Example titanium materials: material numbers; classifications; compositions and specifications of the titanium alloy sheets used as the base material; types of solutions, their temperatures, and immersion times used in the pickling process; and oxygen partial pressures, temperatures and times used in the heat treatments.

TABLE 2

| | | | Pickling Process | | | Heat Treatment | | | |
| --- | --- | --- | --- | --- | --- | --- | --- | --- | --- |
| Material No. | Base Material | Specification | Solution | Temperature (° C.) | Time (min) | Atmosphere (torr) | Temperature (° C.) | Time (min) | Classification |
| 1 | Ti—0.15Pd | JIS Class 7 | 10% $HNO_3$ + 0.25% HF | 25 | 10 | $5 \times 10^{-4}$ | 500 | 30 | Conv. Ex. 1 |
| 2 | Ti—0.4Ni—0.015Pd—0.025Ru—0.14Cr | JIS Class 14 | 10% $HNO_3$ + 0.25% HF | 25 | 10 | $5 \times 10^{-4}$ | 500 | 30 | Conv. Ex. 2 |
| 3 | Ti—0.055Pd | JIS Class 17 | 10% $HNO_3$ + 0.25% HF | 25 | 10 | $5 \times 10^{-4}$ | 500 | 30 | Conv. Ex. 3 |
| 4 | Ti—0.15Pd | JIS Class 7 | 5% $HNO_3$ + 0.5% HF | 35 | 10 | — | — | — | Conv. Ex. 4 |
| 5 | Ti—0.4Ni—0.015Pd—0.025Ru—0.14Cr | JIS Class 14 | 1st: 2.5% HF<br>2nd: 0.1% $HNO_3$ + 0.5% HF | 15<br>35 | 5<br>10 | — | — | — | Conv. Ex. 5 |
| 6 | Ti—0.05Pd | JIS Class 17 | 1st: 25% $H_2SO_4$<br>2nd: 5% $HNO_3$ + 0.005% HF | 20<br>35 | 30<br>10 | — | — | — | Conv. Ex. 6 |

[Titanium Material of Patent Literature 4]

Specimens, each having a size of 30 mm by 30 mm, were cut from the above-mentioned three types of sheets, and the surface of the specimens was dry polished using water proof emery paper (SiC). The polishing was carried out using several types of water proof emery paper of different grit numbers, with a finish polishing process performed using 600 grit emery paper. The polished specimens were ultrasonic cleaned in acetone and then subjected to a pickling process by immersion into an aqueous solution containing 10 mass % nitric acid, which is an oxidizing acid, and 0.25 mass % hydrofluoric acid, which is a non-oxidizing acid for ten minutes (at 25° C.).

Thereafter, the pickled specimens were heat treated to produce the titanium materials (Conventional Examples 1 to 3). The heat treatment was carried out for 30 minutes at 500° C. using a vacuum heat treatment furnace at a pressure of $4 \times 10^{-5}$ torr (an oxygen partial pressure of $4 \times 10^{-5}$ torr or less).

(2) Titanium Materials of Inventive Example and Comparative Example

[Titanium Alloy]

In the inventive examples and the comparative examples, firstly, titanium alloys were cast. In the casting of the titanium alloys, the following raw materials were used: commercially available industrial pure titanium sponge (JIS Class 1), a palladium (Pd) powder manufactured by KISHIDA CHEMICAL Co., Ltd. (99.9% pure), a ruthenium (Ru) powder manufactured by KISHIDA CHEMICAL Co., Ltd. (99.9% pure), yttrium (Y) chips manufactured by KISHIDA CHEMICAL Co., Ltd. (99.9% pure), a rare earth metal ingot, and an electrolytic cobalt (Co) ingot (99.8% pure). The rare earth metal ingot was an ingot of Mm, La or Nd, 99% pure except for the Mm. The composition of the Mm used was as follows: La: 28.6%, Ce: 48.8%, Pr: 6.4%, and Nd: 16.2%, Table 3 shows the material numbers, classification, and compositions of the cast titanium alloys. In Table 3, The symbol "-" in the alloy composition section indicates that the element was below the detection limit

TABLE 3

| | Alloy Composition (balance: Ti and impurities) | | | | Pickling Process | | | Heat Treatment | | | |
|---|---|---|---|---|---|---|---|---|---|---|---|
| | REM | | PGM | | | | | | | | |
| Material No. | Type | Content (mass %) | Type | Content (mass %) | Solution | Temperature (° C.) | Time (min) | Atmosphere Composition | Temperature (° C.) | Time (min) | Classification |
| 7  | Y  | 0.005 | Pd | 0.02  | 7.5% HCl         | 60 | 1.0 | —          | —   | —  | Inv. Ex. 1  |
| 8  | Y  | 0.01  | Pd | 0.02  | 7.5% HCl         | 60 | 1.0 | —          | —   | —  | Inv. Ex. 2  |
| 9  | Y  | 0.09  | Pd | 0.02  | 7.5% HCl         | 60 | 0.5 | —          | —   | —  | Inv. Ex. 3  |
| 10 | —  | —     | Pd | 0.02  | 7.5% HCl         | 60 | 1.0 | —          | —   | —  | Comp. Ex. 1 |
| 11 | Y  | 0.11  | Pd | 0.02  | 7.5% HCl         | 60 | 1.0 | —          | —   | —  | Comp. Ex. 2 |
| 12 | Y  | 0.02  | Pd | 0.004 | 7.5% HCl         | 60 | 1.0 | —          | —   | —  | Comp. Ex. 3 |
| 13 | Y  | 0.02  | Pd | 0.005 | 7.5% HCl         | 60 | 1.0 | —          | —   | —  | Inv. Ex. 4  |
| 14 | Y  | 0.02  | Pd | 0.15  | 7.5% HCl         | 60 | 1.0 | —          | —   | —  | Inv. Ex. 5  |
| 15 | Y  | 0.02  | Ru | 0.05  | 7.5% HCl         | 60 | 1.0 | —          | —   | —  | Inv. Ex. 6  |
| 16 | Y  | 0.02  | Pd | 0.02  | 7.5% HCl         | 60 | 1.0 | —          | —   | —  | Inv. Ex. 7  |
|    |    |       | Ru | 0.03  |                  |    |     |            |     |    |             |
| 17 | La | 0.02  | Pd | 0.05  | 7.5% HCl         | 65 | 0.5 | —          | —   | —  | Inv. Ex. 8  |
| 18 | Mm | 0.02  | Ir | 0.05  | 7.5% HCl         | 60 | 1.0 | —          | —   | —  | Inv. Ex. 9  |
| 19 | Nd | 0.02  | Pd | 0.05  | 7.5% HCl         | 60 | 1.0 | —          | —   | —  | Inv. Ex. 10 |
| 20 | —  | —     | Pd | 0.05  | 7.5% HCl         | 60 | 1.0 | —          | —   | —  | Comp. Ex. 4 |
| 21 | Y  | 0.02  | Pd | 0.02  | —                | —  | —   | —          | —   | —  | Comp. Ex. 5 |
| 22 | Y  | 0.02  | Pd | 0.02  | 25% $H_2SO_4$    | 70 | 2.0 | —          | —   | —  | Inv. Ex. 11 |
| 23 | Y  | 0.02  | Pd | 0.02  | 1% HF            | 30 | 1.5 | —          | —   | —  | Inv. Ex. 12 |
| 24 | Y  | 0.02  | Pd | 0.02  | 4% $HNO_3$ + 1.5% HF | 45 | 2.0 | —      | —   | —  | Inv. Ex. 13 |
| 25 | Y  | 0.02  | Pd | 0.02  | 4% $HNO_3$ + 1.5% HF | 45 | 2.0 | $N_2$:$H_2$ = 1:3 | 550 | 10 | Inv. Ex. 14 |
| 26 | Y  | 0.02  | Pd | 0.02  | 7.5% HCl         | 60 | 1.0 | Ar         | 450 | 30 | Inv. Ex. 15 |
| 27 | Y  | 0.02  | Pd | 0.02  | 7.5% HCl         | 60 | 1.0 | $N_2$:$H_2$ = 1:3 | 550 | 20 | Inv. Ex. 16 |

The titanium alloys used in Inventive Examples 1 to 16 all had a composition specified by the present invention. Among them, the titanium alloy of Inventive Example 15 contained Y and Ru, the titanium alloy of Inventive Example 16 contained Y, Pd, and Ru, the titanium alloy of Inventive Example 18 contained a rare earth metal (Mm) and Ir, and the titanium alloy of the other inventive examples contained Y and Pd.

The titanium materials of Comparative Examples 1 to 5 were made of a titanium alloy having a composition outside the range specified by the present invention or a titanium alloy which was not subjected to a later-described treatment for platinum group metal concentration on the surface. The titanium alloy used in Comparative Example 1 did not contain a rare earth metal, and the titanium alloy used in Comparative Example 2 had a rare earth metal (Y) content above the range specified by the present invention. The titanium alloy used in Comparative Example 3 had a platinum group metal (Pd) content below the range specified by the present invention. The titanium alloy used in Comparative Example 4 did not contain a rare earth metal. The titanium material of Comparative Example 5 was made of a titanium alloy having a composition within the range specified by the present invention and which was not subjected to a later-described pickling process for platinum group metal concentration on the surface.

[Process for Preparing Titanium Material]

In the inventive examples and comparative examples, five ingots, each made of the above-mentioned materials and about 80 grams in weight, were melted. Then all the five ingots were combined and remelted to prepare a square ingot with a thickness of 15 mm. The finished square ingot was remelted for homogenization and again formed into a square ingot with a thickness of 15 mm. That is, melting was performed three times in total.

Since the square ingots of all the inventive examples and comparative examples contain trace quantities of platinum group metal and rare earth metal, a heat treatment for homogenization was applied under the following conditions to reduce segregation of the elements.

Atmosphere: a vacuum atmosphere of less than $10^{-3}$ torr;
Heating temperature: 1100° C.;
Heating time: 24 hours.

The square ingots subjected to the homogenization heat treatment were rolled by the following procedure and formed into sheet blanks with a thickness of 1.5 mm.

(a) The ingots heated to 1100° C. were hot rolled in the β phase field into materials having a thickness of 9 mm after rolling;

(b) The materials rolled in the process (a) were heated to 875° C., and hot rolled in the α-β phase field into materials having a thickness of 4.5 mm after rolling (some of the materials were hot rolled into a thickness of 6.0 mm for use as a separator in fuel cell performance evaluations as described in the section (3) below); and (c) The materials rolled in the process (b) were machined to remove the scale on the top and back surfaces for the glossy metal surface to be exposed to the top surface, and then were cold rolled into sheet materials having a thickness of 0.5 mm The sheet materials obtained from the rolling were stress relief annealed in a vacuum atmosphere at 750° C. for 30 minutes to prepare the titanium materials.

In the inventive examples and comparative examples (excluding Comparative Example 5), an attempt was made to form the film formed of a titanium oxide and a platinum group metal by pickling the titanium materials and allowing the platinum group metal to be concentrated on the surface of the titanium material. For the pickling process, an aqueous solution containing 7.5 mass % hydrochloric acid, an aqueous solution containing 25 mass % sulfuric acid, an aqueous solution containing 1 mass % hydrofluoric acid, or an aqueous solution containing 4 mass % nitric acid and 1.5 mass % hydrofluoric acid was used. In the pickling process, the temperature of the aqueous solution was adjusted to 30° C. to 70° C., and the immersion time was 0.5 to 2 minutes.

Table 3 shows the aqueous solutions that were used in the pickling process, their temperatures and the immersion times.

In Inventive Examples 14 to 16, a heat treatment was performed on the pickled titanium materials. The heat treatment was carried out in a continuous bright annealing furnace in a non-oxidizing atmosphere containing nitrogen gas and hydrogen gas at a ratio of 1:3, or in a batch annealing furnace in an inert gas atmosphere of argon gas. The heating temperatures for the titanium materials ranged from 450° C. to 550° C., and the heating times ranged from 10 to 30 minutes. Table 3 shows the atmosphere conditions, heating temperatures and heating times for the heat treatment. In Table 3, the symbol "-" indicates that no heat treatment was performed.

2. Titanium Material Evaluation Test

To evaluate the titanium materials of the conventional examples, inventive examples and comparative examples produced by the above procedures, measurement of contact resistance, examination of corrosion resistance, and evaluation of fuel cell performance were made. The procedure is described below.

(1) Measurement of Contact Resistance

Figure 3:
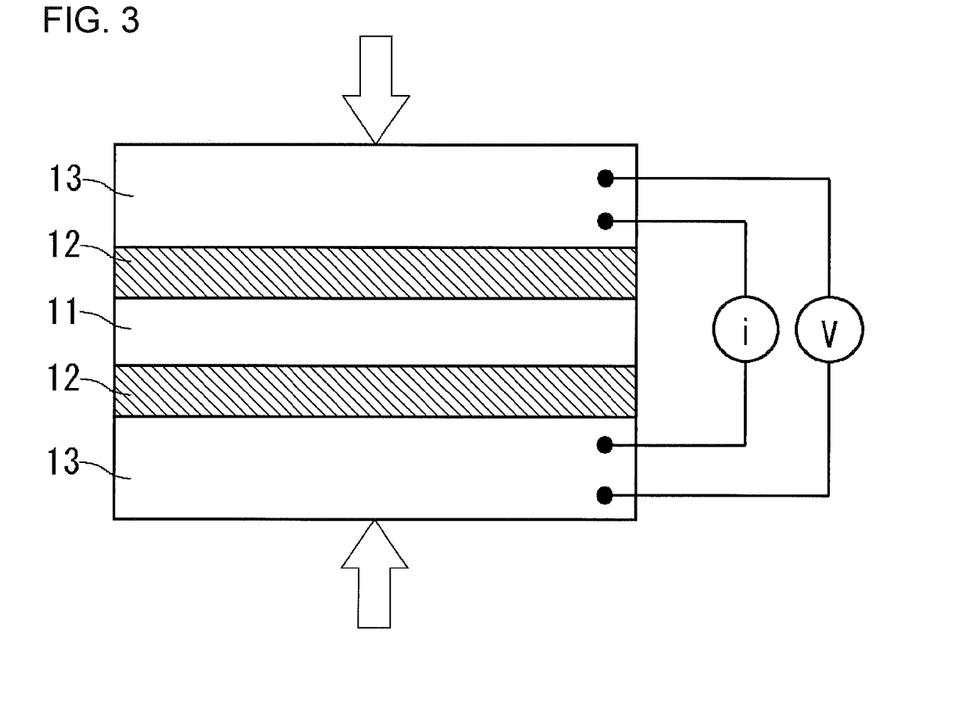
FIG. 3 is a schematic diagram of an apparatus used for measurement of the contact resistance of the titanium materials.

In accordance with a method reported in papers or the like (e.g., Non-Patent Literature 1), measurements of the contact resistance of the titanium materials were carried out using the apparatus shown in FIG. 3.

FIG. 3 is a schematic diagram of an apparatus used for the measurement of the contact resistance of the titanium materials. FIG. 3 illustrates a titanium material 11, which is a test specimen, a gold-plated electrode 13, a gas diffusion layer 12. In the measurements of the contact resistance of the titanium materials, the titanium material 11 was sandwiched between the gas diffusion layers 12, and these were sandwiched together between the gold-plated electrodes 13. In this state, a load of 5 kgf/cm$^2$ or 20 kgf/cm$^2$ was applied at both ends where the gold-plated electrodes 13 are disposed (see the outlined arrow in FIG. 3). Then, a constant current was passed between the electrodes and the resulting voltage drop between the gas diffusion layer 12 and the titanium material 11 was measured to calculate the contact resistance based on the measurement results. The calculated value of resistance is a sum of the contact resistance values of both sides of the sandwiched gas diffusion layer, and thus the calculated value was divided by two to find a contact resistance value of one side of the gas diffusion layer for evaluation.

The gas diffusion layer 12 was made of carbon paper (TGP-H-90, manufactured by Toray Industries, Inc.) and had an area of 1 cm$^2$. For measurement of the current value and the voltage drop, a digital multi-meter (KEITHLEY 2001, manufactured by TOYO Corporation) was used.

(2) Examination of Corrosion Resistance in Simulated Fuel Cell Environment

The titanium materials were immersed in a $H_2SO_4$ solution having a pH of 2 at 90° C. for 96 hours, and then sufficiently rinsed with water and dried. Subsequently, the measurements of the contact resistance as described above were made. If the titanium material does not have good corrosion resistance, the passivation film on the surface grows, which results in an increase in contact resistance as compared to that prior to immersion.

(3) Fuel Cell Performance Evaluation

[Single Cell]

For fuel cell performance evaluation, EFC 50, a commercially available single-cell polymer electrolyte fuel cell manufactured by ElectroChem, Inc., USA, was used by making modifications thereto.

The details of the titanium separator that was used in the cell are as follows. A titanium alloy plate having a thickness of 6.0 mm was prepared by hot rolling in accordance with the procedures (a) and (b) as described in the above section [Process for Preparing Titanium Material]. This titanium alloy plate is provided, by machining, with gas channels of 2 mm width and 1 mm depth, having the shape as shown in FIG. 1, machined into both sides thereof (the anode side and cathode side), and then subjected to electro-discharge machining. Thereafter, it was subjected to a surface treatment (pickling or pickling plus heat treatment for some examples) under conditions as shown in Table 2 or Table 3 to produce a titanium separator. This titanium separator was evaluated in the condition of being mounted in a single-cell polymer electrolyte fuel cell. In Examples, evaluations were made on a single cell basis. This is because, if a stack of cells is used for evaluation, the evaluation results will be affected by the techniques of stacking.

As the membrane electrode assembly (MEA), FC50-MEA, a standard MEA for PEFCs (Nafion-1135 membrane used), manufactured by TOYO Corporation, was used.

As the anode fuel gas, a hydrogen gas that is 99.9999% pure was used, and as the cathode gas, air was used. The entire cell body was held at a temperature of 70±2° C., and the humidity inside the cell was controlled such that it corresponds to an entry-side dew point of 70° C. The pressure inside the cell was 1 atm.

The gas pressures of the hydrogen gas and air to be introduced into the cell were adjusted to 0.04 to 0.20 bar. For the cell performance evaluation, measurements were successively made starting from a condition in which the cell voltage reached 0.62±0.04 V per single cell at 0.5 A/cm$^2$.

[Evaluation Items]

The above single cell was evaluated as to the items (a) to (d) listed below.

(a) Initial Cell Voltage

For property evaluation, the initial cell voltage was defined as follows: the measurement of the voltage of the single cell started when the current density reached 0.5 A/cm$^2$ after the supply of the fuel gas, and the highest value among the measured cell voltages during the first 48 hours was defined as the initial cell voltage.

(b) Voltage Decay Rate of Cell

The voltage decay rate of the fuel cell was defined as follows by using the cell voltage (at a current density of 0.5 A/cm$^2$) measured 500 hours after the initial cell voltage was reached. As is clear from the definition below, the voltage decay rate indicates a rate of reduction in cell voltage per hour.

$$\text{Voltage decay rate} = \{\text{Initial cell voltage (V)} - \text{Cell voltage after 500 hours (V)}\}/500 \text{ hours.}$$

(c) Thickness of Pd-Concentrated Layer

Profiles of Pd concentration versus depth from the surface of the titanium separator were obtained by the GDOES measurement under the conditions as shown in Table 1. The thickness of the concentrated layer was defined as the depth where the Pd concentration was half the maximum value in the Pd concentration profile. The measurement of the Pd concentration profile was made on the titanium separator before being mounted in the single cell.

(d) Surface Pd Concentration

The Pd concentration on the surface of the titanium separator (surface of the Pd-concentrated layer) was calculated by measuring the quantitative values of oxygen, titanium, and Pd by the GDOES measurement under the conditions as shown in Table 1. The measured values were corrected so that the total amount of oxygen, titanium, and the platinum group metal equaled 100%. The measurements immediately under the concentrated layer, a layer of oxide formed only of titanium in which no Pd was present was observed. It is believed that this layer of oxide interrupts the electrical connection and therefore leads to a high contact resistance.

TABLE 4

| Material No. | Classification | PGM Type | PGM Content (mass %) | Pickling Time (min) | Initial Contact Resistance 5 kgf/cm² (mΩ·cm²) | Initial Contact Resistance 20 kgf/cm² (mΩ·cm²) | Contact Resistance after Corrosion Test 5 kgf/cm² (mΩ·cm²) | Contact Resistance after Corrosion Test 20 kgf/cm² (mΩ·cm²) | Single Cell Initial Voltage (V) | Single Cell Voltage Decay Rate (μV/hr) | Pd-Concentrated Layer Thickness (nm) | Pd-Concentrated Layer Surface Concentration (%) |
|---|---|---|---|---|---|---|---|---|---|---|---|---|
| 1 | Conv. Ex. 1 | Pd | 0.15 | 10 | 9.9 | 3.2 | 11.7 | 3.5 | 0.70 | −0.92 | 4.4 | 11 |
| 2 | Conv. Ex. 2 | Pd | 0.015 | 10 | 18.9 | 11.1 | 19.5 | 12.3 | 0.69 | −0.94 | 2.4 | 0.5 |
| 3 | Conv. Ex. 3 | Pd | 0.055 | 10 | 11.1 | 3.5 | 12.2 | 4.2 | 0.70 | −0.93 | 3.1 | 6.0 |
| 4 | Conv. Ex. 4 | Pd | 0.15 | 10 | 34.0 | 13.4 | 285 | 22 | — | — | 72 | 9.1 |
| 5 | Conv. Ex. 5 | Pd | 0.015 | 15 | 18.2 | 10.7 | 19.2 | 14.2 | 0.69 | −0.95 | 2.2 | 2.7 |
| 6 | Conv. Ex. 6 | Pd | 0.02 | 40 | 15.4 | 10.1 | 17.8 | 13.2 | 0.69 | −0.96 | 2.1 | 3.7 |
| 7 | Inv. Ex. 1 | Pd | 0.02 | 1 | 11.3 | 3.4 | 14.5 | 9.7 | 0.70 | −0.91 | 3.1 | 3.4 |
| 8 | Inv. Ex. 2 | Pd | 0.02 | 1 | 10.4 | 3.11 | 12.7 | 4.4 | 0.70 | −0.92 | 3.4 | 3.2 |
| 9 | Inv. Ex. 3 | Pd | 0.02 | 0.5 | 9.1 | 2.8 | 9.6 | 2.9 | 0.71 | −0.91 | 3.0 | 3.4 |
| 10 | Comp. Ex. 1 | Pd | 0.02 | 1 | 68.5 | 16.2 | 92.4 | 21.2 | 0.67 | −2.4 | 0 | 0 |
| 11 | Comp. Ex. 2 | Pd | 0.02 | 1 | 10.4 | 2.91 | 78.4 | 19.2 | 0.70 | −2.7 | 4.1 | 3.8 |
| 12 | Comp. Ex. 3 | Pd | 0.004 | 1 | 19.4 | 11.6 | 21.2 | 12.6 | 0.68 | −1.9 | 1.7 | 0.9 |
| 13 | Inv. Ex. 4 | Pd | 0.005 | 1 | 13.6 | 6.4 | 14.1 | 6.7 | 0.70 | −0.93 | 2.1 | 2.1 |
| 14 | Inv. Ex. 5 | Pd | 0.15 | 1 | 9.2 | 2.85 | 9.8 | 2.98 | 0.71 | −0.92 | 4.3 | 18 |
| 15 | Inv. Ex. 6 | Ru | 0.05 | 1 | 9.4 | 2.77 | 9.8 | 3.02 | 0.71 | −0.96 | — | — |
| 16 | Inv. Ex. 7 | Pd | 0.02 | 1 | 8.1 | 2.2 | 8.7 | 2.8 | 0.71 | −0.91 | 3.1 | 3.4 |
| 17 | Inv. Ex. 8 | Pd | 0.05 | 0.5 | 7.7 | 2.1 | 8.1 | 2.3 | 0.71 | −0.93 | 4.4 | 20.1 |
| 18 | Inv. Ex. 9 | Ir | 0.05 | 1 | 9.1 | 2.9 | 10.3 | 3.2 | 0.71 | −0.97 | — | — |
| 19 | Inv. Ex. 10 | Pd | 0.05 | 1 | 9.0 | 3.0 | 10.1 | 3.3 | 0.70 | −0.93 | 4.3 | 18.9 |
| 20 | Comp. Ex. 4 | Pd | 0.05 | 1 | 38.5 | 14.1 | 94.6 | 31.2 | 0.67 | −2.2 | 0.8 | 0.9 |
| 21 | Comp. Ex. 5 | Pd | 0.02 | — | 48.6 | 13.8 | 121.1 | 64.2 | 0.68 | −2.7 | 0 | 0 |
| 22 | Inv. Ex. 11 | Pd | 0.02 | 2 | 12.2 | 4.1 | 13.6 | 4.8 | 0.70 | −0.94 | 3.4 | 3.7 |
| 23 | Inv. Ex. 12 | Pd | 0.02 | 1.5 | 10.9 | 3.1 | 11.4 | 3.4 | 0.70 | −0.93 | 3.2 | 3.8 |
| 24 | Inv. Ex. 13 | Pd | 0.02 | 2 | 11.1 | 4.0 | 11.9 | 4.3 | 0.70 | −0.92 | 3.3 | 3.7 |
| 25 | Inv. Ex. 14 | Pd | 0.02 | 2 | 12.1 | 4.4 | 12.5 | 4.7 | 0.70 | −0.95 | 3.1 | 3.6 |
| 26 | Inv. Ex. 15 | Pd | 0.02 | 1 | 11.8 | 4.2 | 12.2 | 4.4 | 0.70 | −0.9 | 3.0 | 3.9 |
| 27 | Inv. Ex. 16 | Pd | 0.02 | 1 | 12.4 | 4.7 | 12.5 | 4.9 | 0.70 | −0.94 | 3.4 | 3.7 | of the Pd concentration profiles of the titanium separators were made before they were mounted in the single cell.

3. Test Results

Table 4 shows the material numbers, test classifications, platinum group metal contents, immersion times in the pickling process, contact resistances at the initial stage and after the corrosion resistance test, the initial voltages and voltage decay rates of single cells, and the thicknesses of the Pd-concentrated layers of the titanium separators and the Pd concentrations on the surface thereof, in the conventional examples, inventive examples, and comparative examples. The symbol "-" in the section of the single cell initial voltage and voltage decay rate indicates that single cell performance evaluation was not made for the separator because it exhibited a high contact resistance. The symbol "-" in the thickness and surface Pd concentration sections in the Pd-concentrated layer column indicates that Pd was not detected in the specimen or a platinum group metal other than Pd was used for the specimen.

Regarding Conventional Example 4, no single cell performance evaluation was made because it exhibited high values of contact resistance both at the initial stage and after the corrosion resistance test, and therefore was not considered to be suitable for use in separators. In Conventional Example 4, when the specimen was examined for the presence or absence of a Pd-concentrated layer on its surface, it was observed that a concentrated layer was present in the thickness of about 70 μm from the surface. However, Conventional Examples In Conventional Examples 1 to 6, the immersion times in the pickling process were all 10 minutes or more. Among these, the titanium materials of Conventional Examples 1 to 3, which are equivalent to the titanium material proposed in Patent Literature 4, required a heat treatment after the pickling process. The titanium materials of Conventional Examples 4 to 6 are equivalent to the titanium material proposed in Patent Literature 5. Among these, Conventional Example 4 exhibited a high contact resistance, particularly after the corrosion resistance test, and therefore is not suitable for use in separators. Furthermore, the titanium materials of Conventional Examples 5 and 6 were subjected to the pickling process twice, and required 15 minutes or more of immersion time in total. Thus, due to the poor productivity, they are not suitable for use in separators.

Among Conventional Examples 1 to 6, only Conventional Example 1 exhibited an initial contact resistance of 10 mΩ·cm² or less when a load of 5 kgf/cm² is applied as specified in Patent Literature 4. In Conventional Example 1, the Pd content was high at 0.15%.

Regarding the initial single cell voltage, Conventional Examples 1 and 3 showed a voltage of 0.7 V, which is a high voltage that reflects a low contact resistance. On the other hand, Conventional Examples 2, 5 and 6 showed an initial voltage of less than 0.7 V, which reflects a high contact resistance.

Based on the above, the following findings were made about Conventional Examples 1 to 6: a longer time of pickling process is required; in order to obtain the initial contact resistance as specified in Patent Literature 4, the Pd content must be 0.15% or more; and, in some cases, a heat treatment is required after the pickling process, which may result in an increased cost.

Inventive Examples

In Inventive Examples 1 to 16, it was observed that the immersion times in the pickling process were two minutes or less, which is a short time compared to that in Conventional Examples 1 to 6. Accordingly, it has been observed that the titanium material of the present invention can be produced in high productivity.

Inventive Examples 1 to 16 all showed a contact resistance of less than 15 Ω·cm$^2$ when a load of 5 kgf/cm$^2$ is applied, both at the initial stage and after the corrosion resistance test, which as a whole are lower than the contact resistance of the conventional examples. Among the conventional examples, some of them exhibited a low contact resistance comparable to that of the inventive examples, but in these cases, the materials have a high Pd content at 0.15%. In the present invention, even the titanium material of Inventive Example 4, which has a low Pd content at 0.005%, is capable of achieving a reduction in contact resistance and thus provides an economic advantage.

Furthermore, the single cells including the inventive example titanium separator all had an initial voltage of 0.7 V or more, which is a high voltage, and also had a voltage decay rate smaller than −1.0 μV/hr. Thus, the titanium materials of the present invention are capable of achieving production of a cell having a high voltage output and a low single cell voltage decay rate even with a low Pd content, and therefore provide an economic advantage.

[Rare Earth Metal Content]

Among the titanium materials of Material Nos. 7 to 11, the rare earth metal content was varied while the content of Pd, which is a platinum group metal, was fixed at 0.02%. The immersion time in the pickling process for all of these titanium materials was one minute. When no rare earth metal was added (Material No. 10, Comparative Example 1), the thickness of the Pd-concentrated layer was 0 nm and the Pd concentration on the surface was 0% as shown in Table 4. This indicates that platinum group metal concentration that is caused by pickling did not occur on the surface. As a result, the contact resistance of the titanium material was increased, and the single cell using the titanium separator exhibited a reduced initial voltage and an increased voltage decay. This confirms that a rare earth metal is an essential element in order to reduce the time required for the surface treatment by pickling, i.e., increasing the rate of platinum group metal concentration.

In contrast, in Material Nos. 7 to 9 (Inventive Examples 1 to 3), the rare earth metal was contained in an amount of 0.002% to 0.10%. As a result, all of the titanium materials were provided with a platinum group metal-concentrated layer having a thickness of 1 nm or more on their surfaces after the pickling process, and exhibited good contact resistance both at the initial stage and after the corrosion resistance test. Also, the single cells using any of those titanium separators exhibited a good initial voltage and voltage decay rate.

In the meantime, in Material No. 11 (Comparative Example 2), the rare earth metal was contained in an amount exceeding 0.10%. The material exhibited good contact resistance at the initial stage, but had an increased contact resistance after the corrosion resistance test. No investigation was made regarding the reason for the increased contact resistance after the corrosion resistance test in Comparative Example 2. However, a possible cause of the decreased corrosion resistance is that part of the added rare earth metal remains without being solid dissolved or a compound is formed with titanium. The above test results confirm that a suitable amount of the rare earth metal to be included in the titanium material of the present invention is 0.002% to 0.10%.

[Platinum Group Metal Content]

Platinum group metals are very expensive. For example, Pd costs 1950 Japanese yen per kilogram (according to the market trend of the Nihon Keizai Shimbun dated Aug. 24, 2011). Because of this, when they are used in a titanium material as an additional element, it is desired that the amount of addition be as small as possible.

In Material No. 12 (Comparative Example 3) and Material No. 13 (Inventive Example 4), the content of Y, a rare earth metal, was 0.02% for both of them while the content of Pd, a platinum group metal, was varied between them. Material No. 12 (Comparative Example 3) had a Pd content of 0.004% and exhibited a contact resistance after the corrosion resistance test of greater than 15 mΩ·cm$^2$ when a load of 5 kgf/cm$^2$ was applied. In contrast, Material No. 13 (Inventive Example 4) had a Pd content of 0.005% and exhibited a good contact resistance of 15 mΩ·cm$^2$ or less regardless of the load applied, both at the initial stage and after the corrosion resistance test. This confirms that a suitable lower limit amount of the platinum group metal to be included in the titanium material of the present invention is 0.005%.

In the meantime, a suitable upper limit for the platinum group metal content has been determined to be 0.15% for the following reason, as previously stated: addition of an excessive amount of platinum group metal provides only limited improvement and, from the economic standpoint, results in a price not appropriate for polymer electrolyte fuel cell separators for which cost reduction is desired. In order to balance the economic advantage and the improvement to be obtained, a preferred upper limit for the platinum group metal content is 0.05% as shown in Inventive Examples 8 and 9.

[Pickling Solution]

In Material Nos. 22 to 24 (Inventive Examples 11 to 13), for the surface treatment by pickling, a solution containing a non-oxidizing acid other than hydrochloric acid was used, and the immersion time was 1.5 or 2 minutes. On the other hand, in Material Nos. 7 to 9 and 13 to 19 (Inventive Examples 1 to 10), for the surface treatment by pickling, a solution containing hydrochloric acid as the non-oxidizing acid was used, and the immersion time was 1 minute or less in all cases. This confirms that, in the method for producing a titanium material of the present invention, the use of a non-oxidizing acid solution containing hydrochloric acid as an essential component is preferred because productivity is of great importance.

[Thickness and Pd Concentration of Pd-Concentrated Layer on Surface]

In Material No. 20 (Comparative Example 4), the thickness of the platinum group metal-concentrated layer was less than 1 nm and the platinum group metal concentration on the surface was less than 1.5%. In this case, the resulting titanium material had a contact resistance of greater than 15 mΩ·cm$^2$ both at the initial stage and after the corrosion resistance test, and the single cell using the titanium separator exhibited a reduced initial voltage and an increased voltage decay rate. On the other hand, in Material Nos. 7 to 9, 13 to 19, and 22 to 27 (Inventive Examples 1 to 16), the thickness of the platinum group metal-concentrated layer was 1 nm or more and the platinum group metal concentration on the surface was 1.5% or more in all the titanium materials. Consequently, the titanium materials exhibited good contact resistance both at the initial stage and after the corrosion resistance test, and the single cells using the titanium separators exhibited a good initial voltage and voltage decay rate.

[Evaluation of Single Cell]

In Material Nos. 7 to 9, 13 to 19, and 22 to 27 (Inventive Examples 1 to 16), the single cells using the titanium separators all exhibited an initial voltage of 0.7 V or more and a voltage decay rate of −1.0 μV/h or less. Accordingly, it has been found that, by using the titanium material of the present invention in a polymer electrolyte fuel cell separator, it is possible to provide an excellent polymer electrolyte fuel cell having a high initial voltage and a reduced voltage decay over time.

INDUSTRIAL APPLICABILITY

The titanium material of the present invention is capable of being provided with a film having good electrical conductivity on the surface thereof while requiring a shorter time of pickling process because of a rare earth metal included therein. With this film, the titanium material of the present invention is capable of achieving a reduction in initial contact resistance and ensuring good corrosion resistance. The method for producing a titanium material of the present invention is capable of forming a film having good electrical conductivity without the need for a heat treatment after a pickling process and therefore is able to increase productivity. The polymer electrolyte fuel cell of the present invention includes a separator made of the titanium material of the present invention in which a reduced contact resistance is achieved and good corrosion resistance is ensured as described above. Because of this, the polymer electrolyte fuel cell has a high initial voltage and a reduced voltage decay over time.

Accordingly, the titanium material of the present invention, the method for producing the same, and a polymer electrolyte fuel cell using the same are capable of significantly contributing to enhanced performance of a polymer electrolyte fuel cell and being utilized in a wide range of fuel cell applications.

REFERENCE SIGNS LIST

1: fuel cell,
2: polymer electrolyte membrane,
3: fuel electrode,
4: oxidizing electrode,
5a and 5b: separator,
6a and 6b: channel,
11: titanium material (test specimen),
12: gas diffusion layer (carbon paper),
13: gold-plated electrode

What is claimed is:

1. A titanium material for a polymer electrolyte fuel cell separator consisting of, by mass %,
0.005% to 0.15% of a platinum group metal, 1.0% or less of Ni, 0.5% or less Mo, 0.5% or less V, 0.5% or less Cr, 0.5% or less W, and 0.002% to 0.10% of a rare earth metal, with a balance being Ti and impurities,
wherein the titanium material is provided with a film formed on a surface thereof, a thickness of the film being in a range of 1 to 10 nm, and titanium oxide and the platinum group metal are mixed in the film, and a content of the platinum group metal in the film decreases from a surface of the film to an interface between the titanium material and the film.

2. The titanium material for a polymer electrolyte fuel cell separator according to claim 1, wherein
the concentration of the platinum group metal on the surface of the film is 1.5% by mass or more and 20.1% by mass or less.

3. The titanium material for a polymer electrolyte fuel cell separator according to claim 1, wherein
the rare earth metal is Y.

4. The titanium material for a polymer electrolyte fuel cell separator according to claim 1, wherein
the platinum group metal is Pd.

5. A method for producing a titanium material for a polymer electrolyte fuel cell separator, the method comprising:
subjecting a titanium alloy to a pickling process using a non-oxidizing acid solution, the titanium alloy consisting of, by mass %, 0.005% to 0.15% of a platinum group metal and 0.002% to 0.10% of a rare earth metal, with a balance being Ti and impurities, the pickling process resulting in formation of a film on a surface of the titanium alloy and concentration of the platinum group metal on an outermost surface of the titanium alloy, a thickness of the film being in a range of 1 to 10 nm.

6. The method for producing a titanium material for a polymer electrolyte fuel cell separator according to claim 5, wherein
the non-oxidizing acid solution contains hydrochloric acid as an essential component.

7. A polymer electrolyte fuel cell comprising:
a stack of unit cells, the unit cells being arranged adjacent each other with a separator disposed therebetween, each of the unit cells including a fuel electrode, an oxidizing electrode, and a polymer electrolyte membrane interposed between the fuel electrode and the oxidizing electrode, the stack of unit cells being supplied with a fuel gas and an oxidant gas to generate direct current power,
wherein the separator comprises the titanium material according to claim 1.

* * * * *